United States Patent
Permuy

[19]

[11] Patent Number: 5,936,325
[45] Date of Patent: Aug. 10, 1999

[54] SYNCHRONOUS TYPE ELECTRICAL MACHINE

[75] Inventor: Alfred Permuy, Rueil-Malmaison, France

[73] Assignee: Valeo Electronique, Creteil, France

[21] Appl. No.: 08/998,788

[22] Filed: Dec. 29, 1997

[30] Foreign Application Priority Data

Dec. 31, 1996 [FR] France .................................. 96 16282

[51] Int. Cl.⁶ .................................................. H02K 19/00
[52] U.S. Cl. .......................... 310/162; 310/112; 310/179; 310/261
[58] Field of Search .................................. 310/162, 165, 310/112, 114, 179, 254, 261

[56] References Cited

U.S. PATENT DOCUMENTS

| | | | |
|---|---|---|---|
| 4,450,396 | 5/1984 | Thornton | 318/721 |
| 4,496,868 | 1/1985 | Advolotkin et al. | 310/112 |
| 5,051,640 | 9/1991 | Freise | 310/162 |
| 5,304,882 | 4/1994 | Lipo et al. | 310/156 |
| 5,365,137 | 11/1994 | Richardson et al. | 310/258 |
| 5,481,147 | 1/1996 | Kaplan et al. | 310/154 |
| 5,682,073 | 10/1997 | Mizuno | 310/165 |

FOREIGN PATENT DOCUMENTS

WO 91/16538  10/1991  WIPO .............................. F02N 11/04

*Primary Examiner*—Nestor Ramirez
*Assistant Examiner*—Burt Mullins
*Attorney, Agent, or Firm*—McCormick, Paulding & Huber

[57] ABSTRACT

A synchronous electrical machine comprising a rotor and a stator, each having a plurality of notches, wherein the rotor is a stack of laminations without conductor windings and without permanent magnets, and wherein the stator has magnetizing means defining at least one pair of poles thereon, while the notches of said stator receive at least one secondary winding.

5 Claims, 3 Drawing Sheets

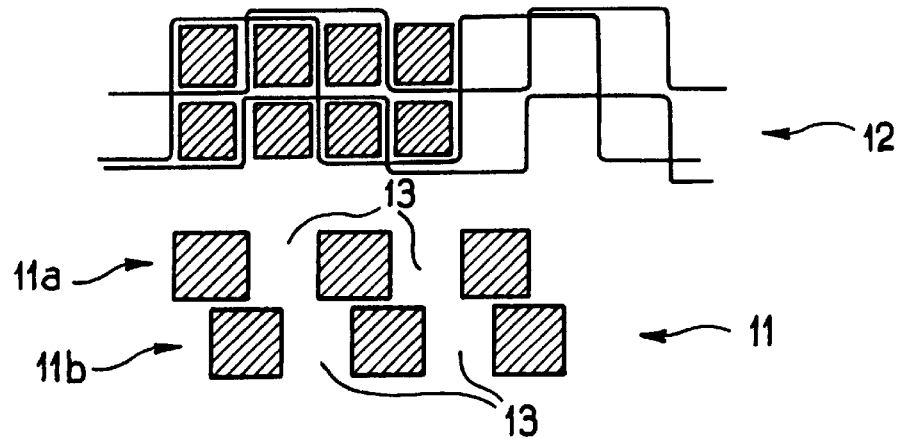
FIG_4
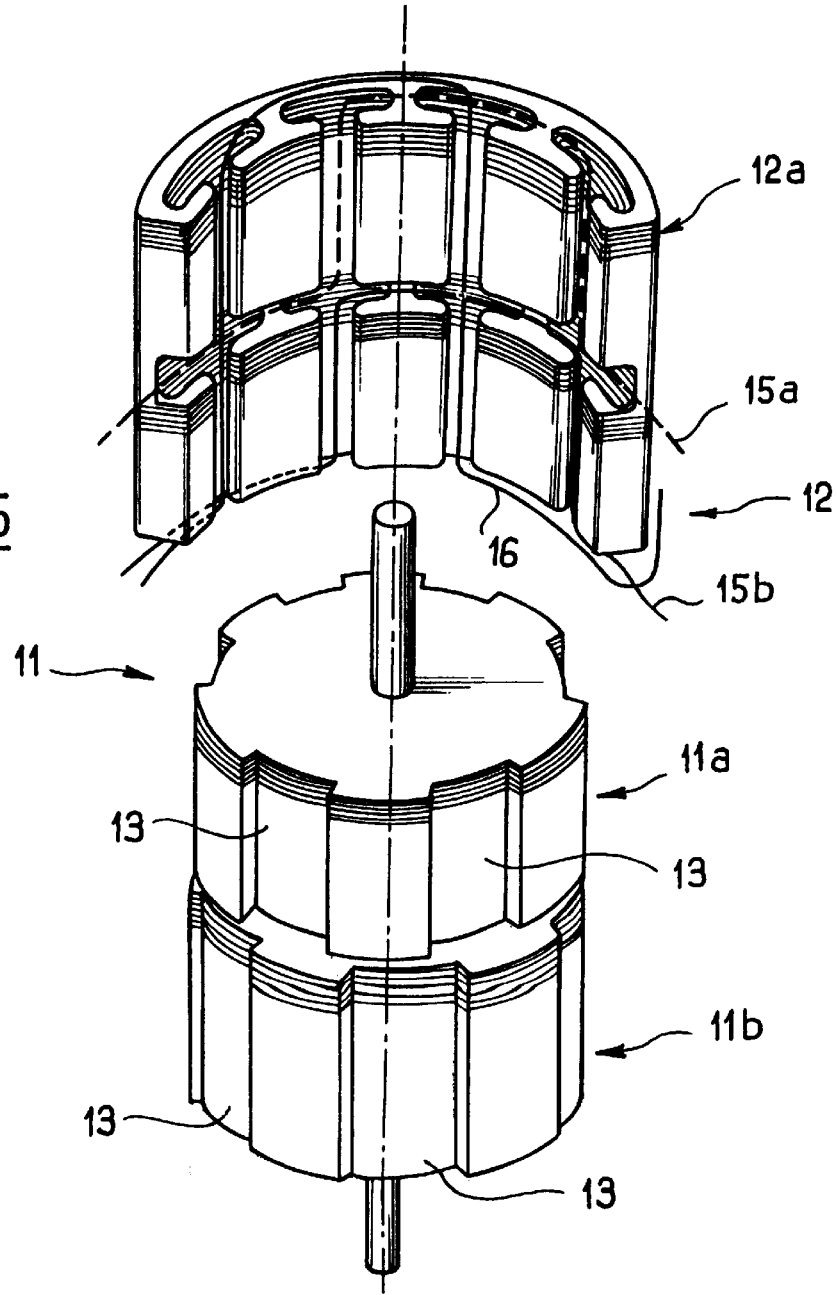
FIG_5

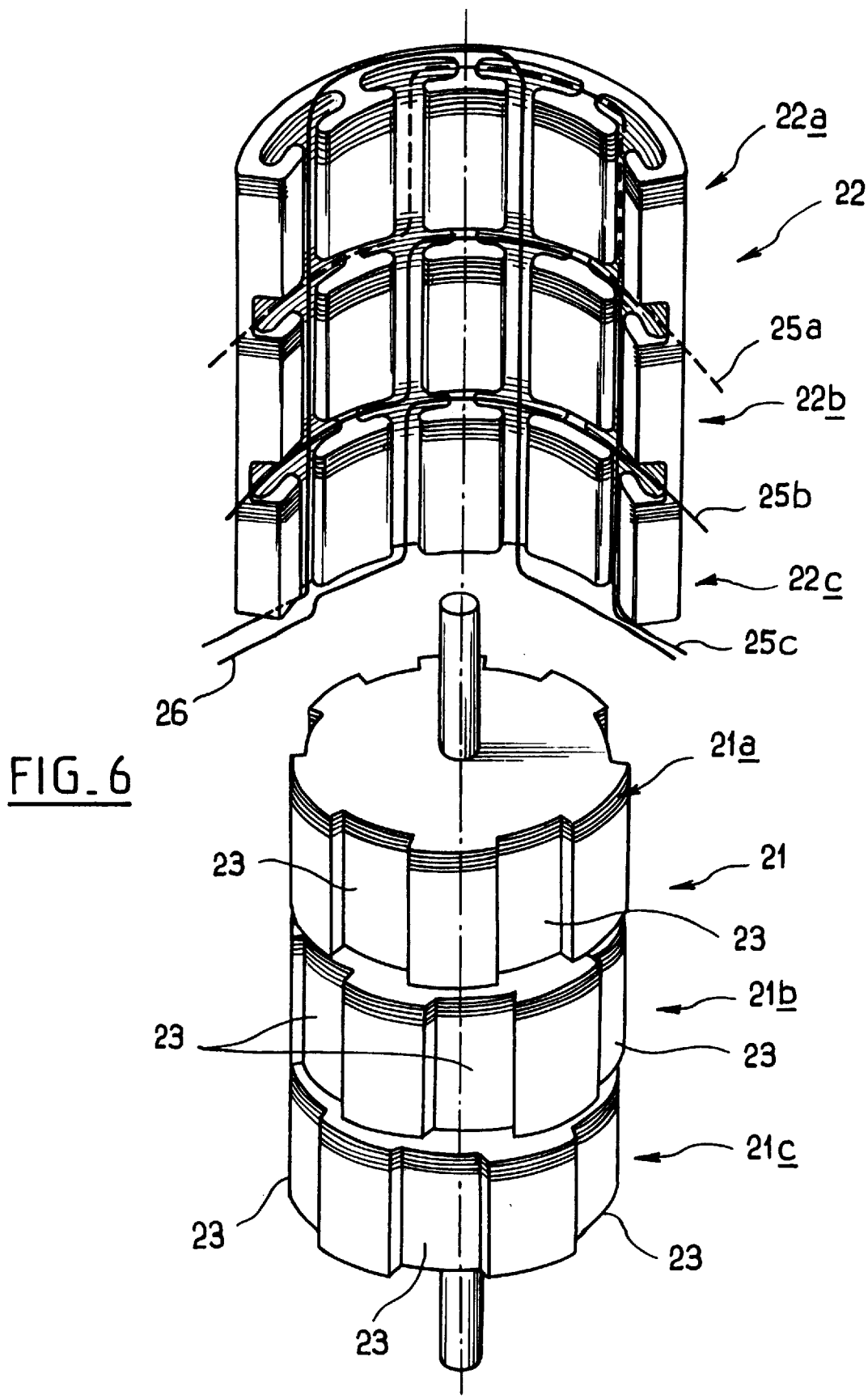
FIG_6

SYNCHRONOUS TYPE ELECTRICAL MACHINE

The present invention relates to synchronous type electrical machines.

BACKGROUND OF THE INVENTION

By way of reference, it is recalled that electrical machines include synchronous machines, asynchronous machines, and variable reluctance machines.

The principles on which those various types of machines operate are very different, and as a result the person so skilled in the art would not envisage transposing solutions known for one of those types of machine to another of those types.

Thus, it should be observed that a synchronous machine, to which the present invention relates, differs from a variable reluctance machine in the following respects:

the size of the stator teeth overlapping a rotor half-tooth;
the presence of a stator primary (or "field") winding in which no back-emf is induced by rotation;
the bipolar nature of the field in the teeth of the rotor; and
the single phase structure of each of the "pancakes" of the rotor.

The synchronous machine of the invention can be used both as a generator of electricity and as an electric motor.

In particular, it is advantageously used in a motor vehicle where it serves both as an alternator and as an electric motor for starting, the rotor of the machine being directly mounted on the shaft of the vehicle engine.

In such a configuration, it is desirable for the rotor of the synchronous machine to be as well balanced as possible, and to avoid it having any permanent magnets or coils.

OBJECT AND SUMMARY OF THE INVENTION

The invention provides a synchronous electrical machine comprising a rotor and a stator, each having a plurality of notches, wherein the rotor is a stack of laminations without conductor windings and without permanent magnets, and wherein the stator has magnetizing means defining at least one pair of poles thereon, while the notches of said stator receive at least one secondary winding.

This machine advantageously further includes the following characteristics on their own or in any technically possible combination:

the magnetizing means comprise at least one primary winding received in the notches of the stator;
each of the stator and the rotor has a plurality of stages, each of the stator stages receiving a secondary winding corresponding to one of the phases of the machine;
the notches of the various stages of the rotor are, from one stage to another, offset angularly by the width between two notches divided by the number of stages;
the notches of the various stages of the rotor are distributed thereon without angular offset from one stage to another, said stator having an inductor winding wound over its full height and common to its various stages; and
the secondary windings of the various stages are wound in corresponding manner on the notches of the stator without angular offset from one stage to another.

BRIEF DESCRIPTION OF THE DRAWINGS

Other characteristics and advantages of the invention appear further from the following description. The description is purely illustrative and non-limiting. It should be read with reference to the accompanying drawings, in which:

FIG. 4 is a developed diagram of the same type as FIG. 1, for a two-phase machine constituting one possible embodiment of the invention;

FIG. 5 is a perspective view similar to that of FIG. 2, but showing the machine of FIG. 4; and FIG. 6 is a perspective view similar to those of FIGS. 2 and 5, but showing a three-phase machine constituting one possible embodiment of the invention.

MORE DETAILED DESCRIPTION

Figure 1:
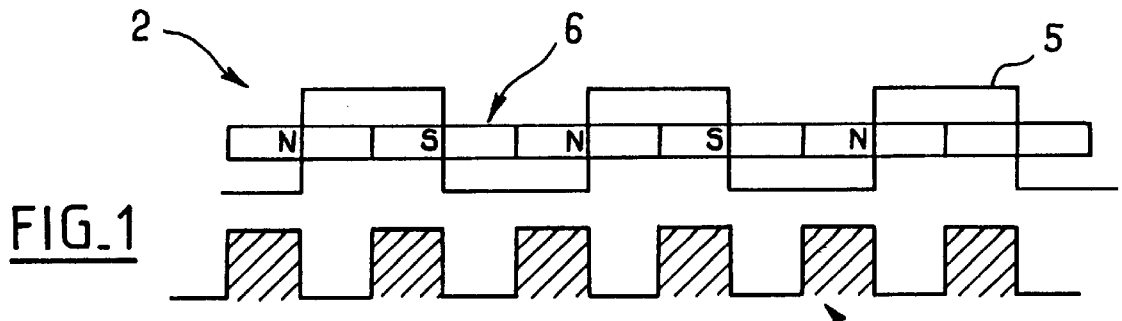
FIG. 1 is a developed view of the notches of the stator and the rotor of a machine constituting one possible embodiment of the invention.
Figure 2:
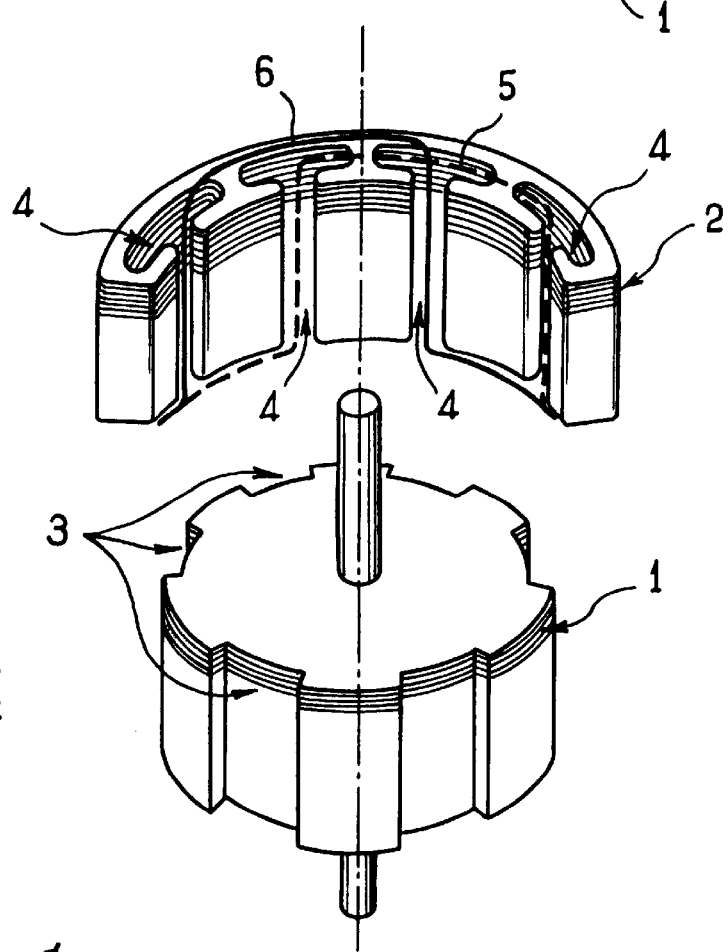
FIG. 2 is a partially cutaway exploded perspective view of the stator and the rotor of a machine of the type shown in FIG. 1.

The single-phase synchronous machine shown in FIGS. 1 and 2 comprises a rotor 1 and a stator 2.

The rotor 1 is constituted by a stack of laminations, and it includes a succession of notches 3 that are regularly distributed around its circumference.

Unlike the rotors of conventional single-phase synchronous machines, the rotor 1 does not have any permanent magnet for defining poles, and its notches 3 do not receive any conductor winding.

The stator 2 includes a structure made up of a stack of laminations. The structure has a plurality of notches 4 which are distributed around its inside circumference and which receive at least one secondary winding 5 and at least one primary winding 6.

The number of notches 4 is twice the number of notches 3.

The windings 5 and 6 are wound on the notches 4, not in loops but in an undulating configuration, the secondary winding 5 being angularly offset by one notch relative to the primary winding 6, and extending in notches 4 centered on the north and south poles defined by said primary winding 6.

Figure 3:
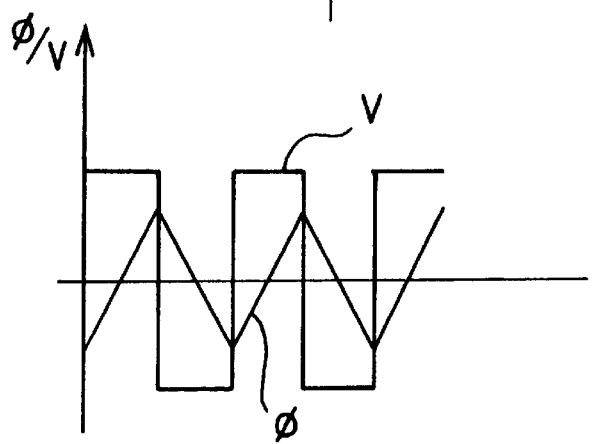
FIG. 3 shows the flux and the phase voltage obtained with a motor of the type shown in FIGS. 1 and 2.

FIG. 3 is a graph showing the appearance of the flux $\phi$ in the secondary winding and the voltage V generated at the terminals of the secondary winding 6 during rotation of the rotor 1 in the stator 2.

Naturally, the primary winding 6 could be replaced by permanent magnets. Nevertheless, solutions using a primary winding are preferred given that they make it possible to vary the field between the poles. In conventional manner, this field variation is used in generator mode to regulate the amplitude of the voltage across the terminals of the secondary winding.

Other variants are also possible. In particular, it is possible to provide a plurality of secondary windings distributed around the stator so as to correspond to a plurality of phases for the machine.

FIGS. 4 and 5 show one possible embodiment of a two-phase machine of the invention. In this embodiment, each of the rotor and the stator, respectively referenced 11 and 12, have two respective stages superposed along the axis of rotation.

The two stages of the rotor, referenced 11a and 11b are respectively in register with the two stages, referenced 12a and 12b, of the stator 12. Each of the two rotor stages 11a and 11b has notches 13 which are regularly distributed around the circumference of the rotor 11, but the notches are offset angularly from one stage to the other by half the distance between two notches.

Both stages 12a and 12b of the stator 12 have notches 14 that are in line with one another from one stage to the other.

A primary winding 16 is distributed over said notches 14 in an undulating configuration, being wound over the full height of the stator 12, with the coils of said winding extending in the notches 14 of the stages 12a and 12b from one end of the stator to the other.

Also, a secondary winding 15a is wound in the notches 14 of the stage 12a, while a secondary winding 15b is wound in the notches 14 of the stage 12b. Both of these windings 15a and 15b are wound with an undulating configuration and in corresponding manner, i.e. without any angular offset between them.

In a variant, provision could be made for the stator notches to be offset from one stage to the other while the notches in the two stages of the rotor are superposed without any angular offset from one stage to the other. Nevertheless, the configuration shown in FIGS. 4 and 5 has the advantage of making it possible to use a common winding to constitute the primary winding of both stages.

More generally, an n-phase electrical machine constituting a possible embodiment of the invention comprises a rotor and a stator, each having n stages of notches, the notches of the stator or of the rotor being offset from one stage to the other by the angular width between two notches divided by n.

As an indication, FIG. 6 shows an embodiment of a three-phase machine of this kind.

This machine has a rotor 21 and a stator 22.

Each of the rotor 21 and the stator 22 has three stages, referenced 21a to 21c for the rotor 21 and 22a to 22c for the stator 22.

The notches 23 of two successive stages of the rotor 21 are offset from one stage to another by the width between two notches divided by three. The notches 24 of the various stages of the stator are disposed in line with one another.

For each stage 22a to 22c, the stator has a secondary winding 25a to 25c wound around its notches 24. A primary winding 26 is would around the full height of the notches 24 of the stator 22.

I claim:

1. A synchronous electrical machine for a motor vehicle comprising a rotor and a stator each having a plurality of notches, wherein the rotor is a stack of laminations without conductor winding and without magnet, said rotor comprising various stages superposed along the axis of rotation, the notches of these stages being, from one stage to another, offset angularly by the width between two notches divided by the number of stages, and wherein the stator presents stages which correspond to the stages of the rotor and which present notches which are in line with one another from one stage to the other and wherein a primary winding received in said notches extends over the full height of the stator from one end of the stator to the other, and wherein secondary windings are wound in the notches of each stage of the stator without any angular offset between each other.

2. A three-phase synchronous machine according to claim 1.

3. A synchronous machine for use both as a generator and as an electric motor, wherein the machine is of a type according to claim 1.

4. A synchronous machine for a motor vehicle, for use both as an alternator and as an electric starter motor, wherein the machine is of a type according to claim 1.

5. A synchronous machine according to claim 4, wherein its rotor is mounted on the shaft of the vehicle engine.

* * * * *